US008523668B2

(12) United States Patent
Rioux et al.

(10) Patent No.: US 8,523,668 B2
(45) Date of Patent: Sep. 3, 2013

(54) CONTROLLING ACCESS TO AND USE OF VIDEO GAME CONSOLES

(76) Inventors: Robert F. Rioux, Ashland, MA (US); Paul DiCarlo, Middleboro, MA (US)

(*) Notice: Subject to any disclaimer, the term of this patent is extended or adjusted under 35 U.S.C. 154(b) by 210 days.

(21) Appl. No.: 13/106,941

(22) Filed: May 13, 2011

(65) Prior Publication Data
US 2011/0281643 A1 Nov. 17, 2011

Related U.S. Application Data

(60) Provisional application No. 61/345,092, filed on May 15, 2010.

(51) Int. Cl.
*A63F 9/18* (2006.01)

(52) U.S. Cl.
USPC .................................. 463/29; 463/46; 463/47

(58) Field of Classification Search
USPC ........................................................... 463/29
See application file for complete search history.

(56) References Cited

U.S. PATENT DOCUMENTS

| | | | |
|---|---|---|---|
| 5,051,837 A | 9/1991 | McJunkin | |
| 5,142,358 A * | 8/1992 | Jason | 348/61 |
| 5,283,475 A | 2/1994 | Berger | |
| 5,716,273 A * | 2/1998 | Yuen | 463/29 |
| 5,731,763 A | 3/1998 | Herweck et al. | |
| 6,011,328 A | 1/2000 | Smith | |
| 6,777,828 B1 | 8/2004 | Rothstein | |
| 7,036,145 B1 * | 4/2006 | Murphy et al. | 726/21 |
| 7,154,380 B1 | 12/2006 | Tarrab, Jr. | |
| 2006/0176643 A1 | 8/2006 | Pecore | |
| 2007/0074284 A1 | 3/2007 | Woog | |
| 2008/0155538 A1 | 6/2008 | Pappas | |
| 2008/0168274 A1* | 7/2008 | Natanzon et al. | 713/175 |

* cited by examiner

*Primary Examiner* — Lawrence Galka

(57) ABSTRACT

The invention generally relates to a lock-box device that requires a child or any other user to answer one or more educational questions correctly before being allowed access to one or more entertainment systems that require power such as a television, a computer, and a video game console.

4 Claims, 4 Drawing Sheets

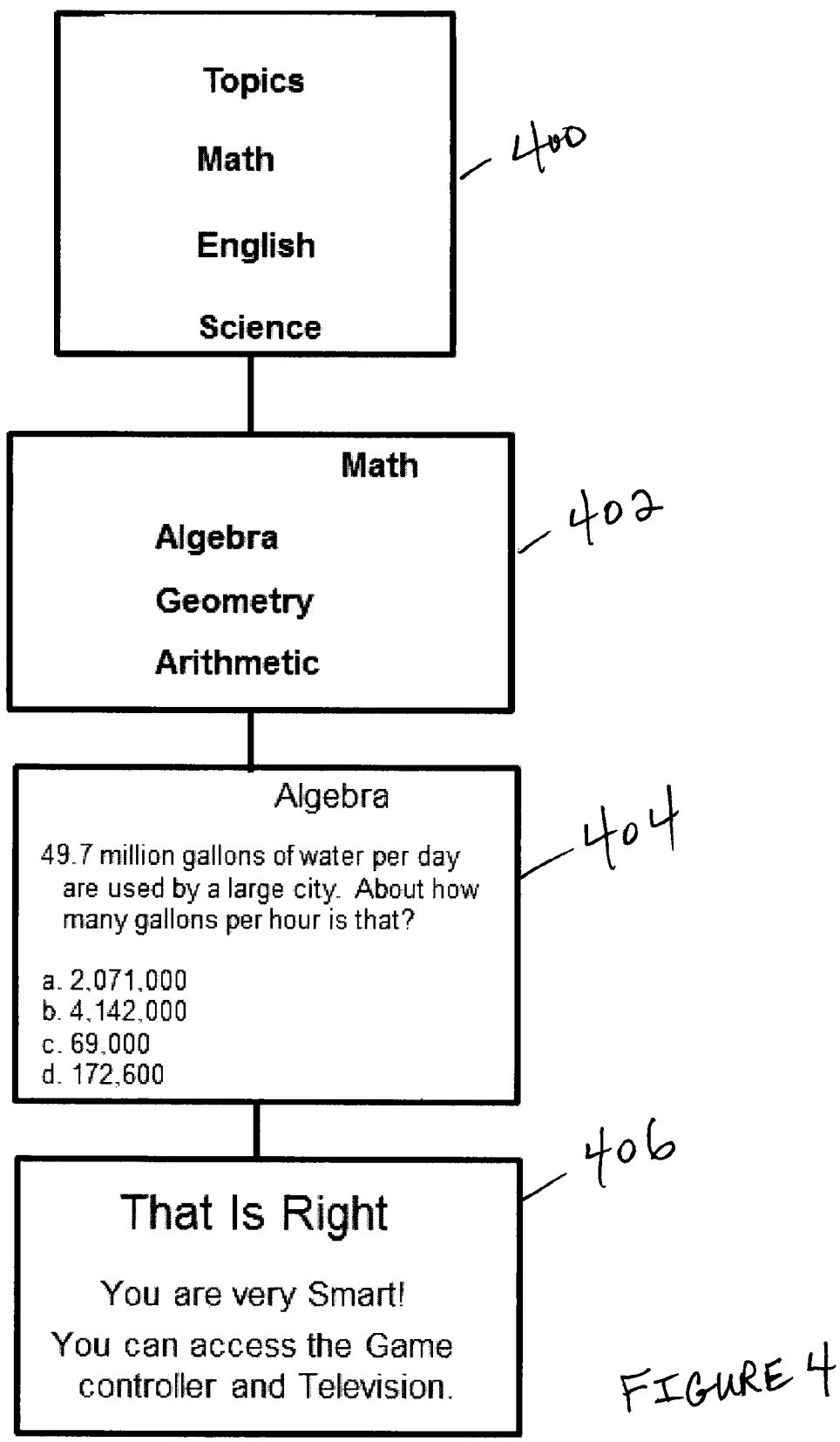

CONTROLLING ACCESS TO AND USE OF VIDEO GAME CONSOLES

CROSS-REFERENCE TO RELATED APPLICATION

This claims priority to and the benefit of Provisional U.S. Patent Application Ser. No. 61/345,092 filed on May 15, 2010. The entirety of Provisional U.S. Patent Application Ser. No. 61/345,092 is incorporated herein by reference.

TECHNICAL FIELD

The invention generally relates to controlling a user's access to and use of a video game console or other electronic device such as a television or personal computer.

BACKGROUND INFORMATION

A common and time-consuming activity by children and adults alike is video game playing. Video games and video game consoles by companies such as Sony, Nintendo, and Microsoft are very popular. Other common and time-consuming activities include watching television and viewing pages of the World Wide Web on a personal computer. These and other activities that involve the use of electronic devices typically include little if any educational content. Many parents, guardians, and supervisors of children are concerned about the amount of time children spend on electronic entertainment such as playing video games, watching television, and surfing the Web.

SUMMARY

The invention generally relates to a device that requires a child or any other user to answer one or more educational questions correctly before being allowed access to one or more entertainment systems that require power such as a television, a computer, a DVD player, a cable TV box, a satellite TV box, and a video game system. Known video game consoles include Microsoft's Xbox, Nintendo's Wii, and Sony's PlayStation. The inventive device can be referred to as a lock-box or a power box, in that it securely houses the power supply plug of one or more electronic entertainment systems and controls the supply of power to the system(s). The inventive device has built-in educational quizzing functionality, and it acts as the gatekeeper for any person that wants to access and use the system(s) plugged securely into the device. The device typically will be set up by a parent, guardian, or other supervisor of the user(s), and the device includes a mechanically and/or electronically lockable housing to prevent or at least resist tampering and to require all users to answer one or more questions before power is delivered and access is provided to the one or more entertainment systems. The device's built-in software will assist, if and as appropriate, the child or other user with answering the one or more questions, by, for example, giving one or more hints to the correct answer. Because the device controls the delivery of electrical power to the system(s) that the user desires to access and use, the device can be used with and to control the access to and use of any type of system that requires power via a corded power plug.

In one particular embodiment according to the invention, a device for controlling access to and use of a video game console comprises a tamper-resistant housing including a lock mechanism. The device also comprises a power outlet disposed within the housing. The outlet is for receiving and electrically connecting to a power plug at the end of a power cord of the video game console. The lock mechanism of the device is operable to lock the power plug within the housing after the power plug is inserted into the power outlet. The device also includes a device power cord extending from and external to its housing. The device's power cord terminates in a device power plug for insertion into an electrical outlet such as a typical household electrical wall socket. The device also includes one or more connectors accessible external to the housing to allow a display to be connected to the device. The display can be a television or a video monitor. A logic and control system of the device is disposed within the housing, and it controls the power outlet. The logic and control system supplies images to be shown on the display to a potential user of the video game console, and these images include educational content in the form of one or more questions in one or more educational subject matter areas. The logic and control system also allows the potential user to provide responses to the one or more questions, and it controls the supply of power to the power outlet based on the responses to those questions. The logic and control system will not supply power to the power outlet unless the responses to the one or more questions are acceptable.

The device also can have one or more other connectors accessible external to the housing to allow a handheld controller unit of the video game console to be plugged in to the device and then used by the potential user to provide his or her responses to the one or more questions posed by the device and displayed on a display connected to the device. Instead of or in addition to the device having the one or more other connectors, the device can have supplied with it either a hard-wired handheld input unit or a wireless handheld input unit, and in any event that handheld input unit is for use by the potential user to provide the responses to the one or more questions. The device also can include one or more additional power outlets disposed within the housing for allowing the device to control the use of more than one video game console. The logic and control system of the device can be configured to supply power to the power outlet only if the responses include enough correct answers to the one or more questions, and that logic/control system also can be configured to stop supplying power to the power outlet after a predetermined amount of time from when the responses were deemed acceptable.

Various other objects, advantages, and details of the invention herein disclosed will become apparent through reference to the following detailed description, the accompanying drawings, and the claims. The various embodiments disclosed herein, as well as each of the various features of those embodiments, are not mutually exclusive and can exist in various combinations and permutations whether or not expressly pointed out herein.

BRIEF DESCRIPTION OF THE DRAWINGS

In the drawings, like structures are referenced by the same or similar reference numbers throughout the various views. The illustrations in the drawings are not necessarily drawn to scale, the emphasis instead being placed generally on illustrating the principles of the invention and the disclosed embodiments.

FIG. 4 shows a series of simplified screen shots that appear on a display screen coupled to the lock-box device of the invention as it operates.

DESCRIPTION

Figure 1:
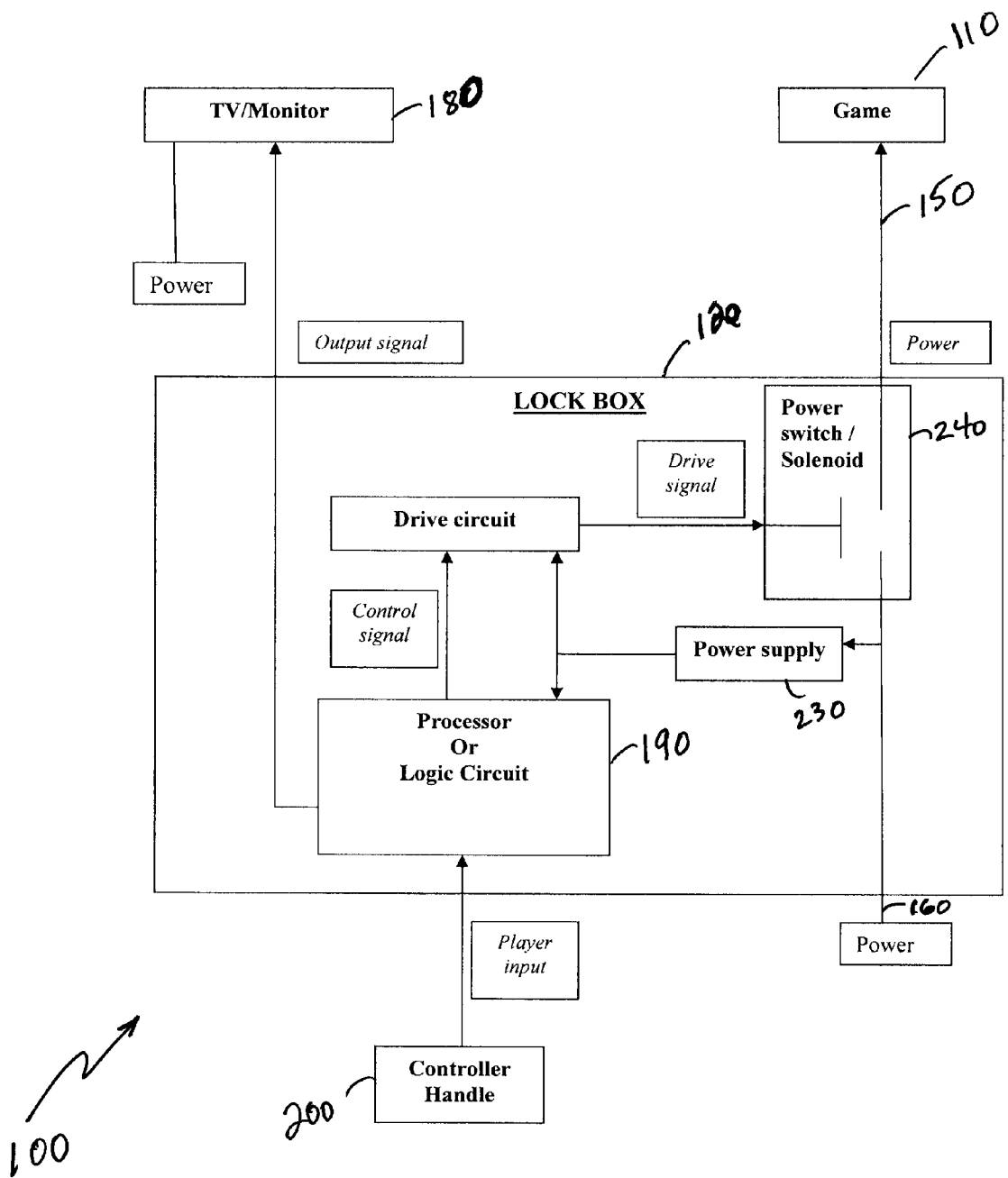
FIG. 1 is a block diagram of at least some of the basic components of a lock-box device according to the invention as well as the components that get connected to the device to make it operable to control access to and use of one or more electronic entertainment systems.
Figure 2:
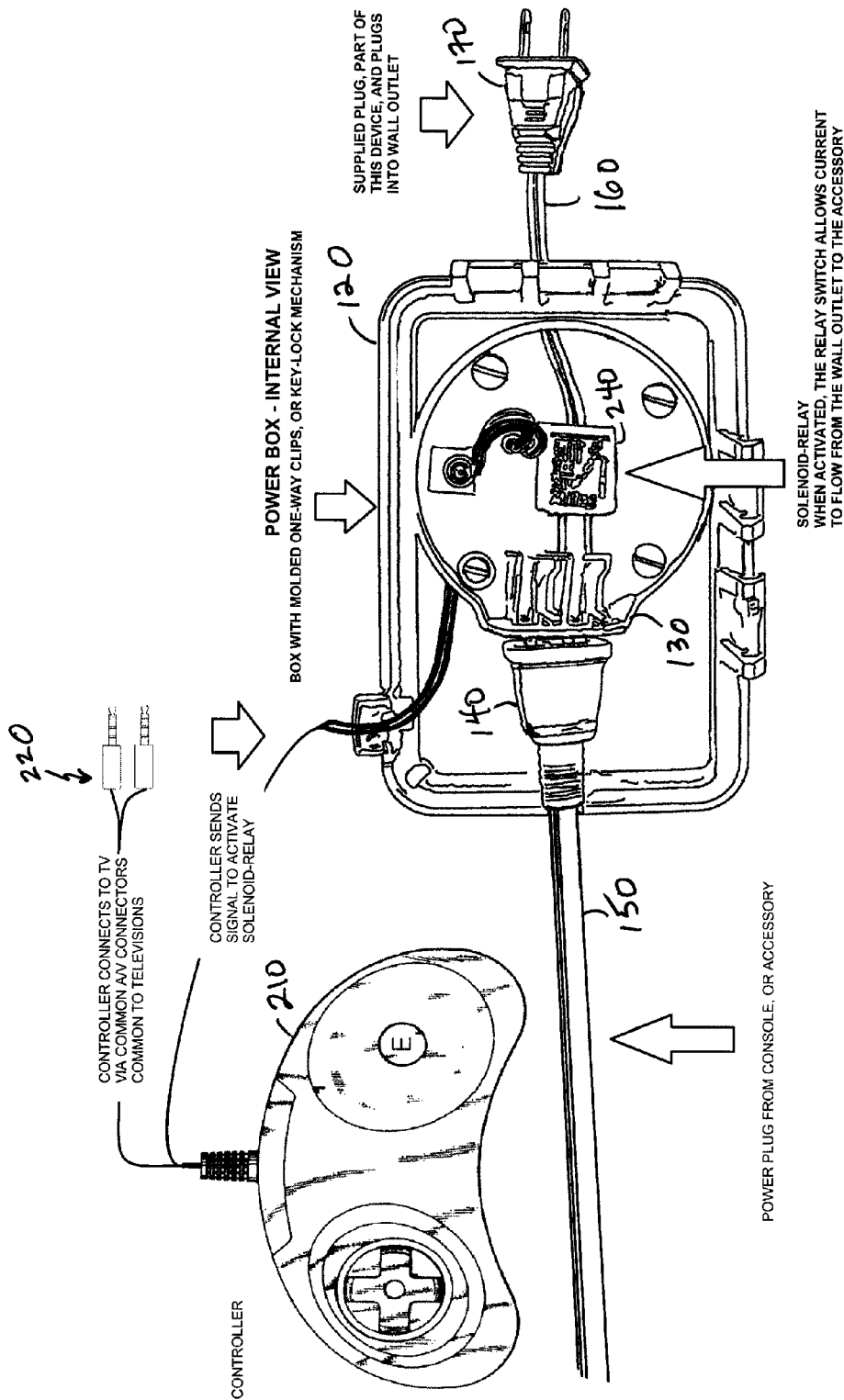
FIG. 2 is an internal view into the housing of the lock-box device of the invention, with the lockable top removed and not shown.

As shown in FIGS. 1 and 2, a lock-box device 100 for controlling access to and use of at least one video game console 110 (or other electronic system such as a television, a computer, a DVD player, a cable TV box, a satellite TV box, or other electronic entertainment system, for example) comprises a tamper-proof, or at least tamper-resistant, housing 120 that includes a lock mechanism. The device 100 also has at least one power outlet 130 disposed within the housing 120. The outlet 130 is for receiving and electrically connecting to a power plug 140 at the end of a power cord 150 of the video game console 110. The lock mechanism of the device 100 provides the tamper-resistance of the device 100, and the lock mechanism is operable to lock the power plug 140 within the housing 120 after the power plug 140 is inserted into the power outlet 130. The power cord 150 extends out of the housing 120 through a hole or other opening in the housing 120 that is sized to allow that, but the hole or other opening in the housing 120 is not sized to allow the power plug 140 to pass through it. Thus, even if someone were to pull on the power cord 150 after the power plug 140 is plugged into the power outlet 130 and the housing is locked to secure the power plug 140 therewithin, the power plug 140 may be pulled out of the power outlet 130, but the power plug 140 will not be able to be pulled out of the locked housing 120 of the device 100 without somehow breaking open the locked housing 120 of the device 100. A parent, guardian, or other supervisor of a child typically will be the one that is able to lock and unlock the lock mechanism of the device 100, and that adult thus will be the one that opens the housing 120 by unlocking it, plugs the power plug 140 into the device's internal power outlet 130, and then closes the housing 120 and locks the lock mechanism to secure the plugged-in power plug inside the housing 120 of the device 100.

The lock mechanism can be one or more molded one-way clips that are used to hold a top of the housing 120 to the shown bottom of the housing 120 (FIG. 2), or the lock mechanism could be a mechanical key-lock that requires a physical key to be inserted and turned to lock the top of the housing 120 to the bottom of the housing 120 and also to unlock the top from the bottom. Another option is an electromechanical lock that requires a code to be entered into a keypad or screen on the top or bottom of the housing 120. A numerical tumbler lock would work as well, such as the kind typically used as a bicycle lock. Other possible lock mechanisms include one-way locks such as the above-mentioned molded one-way clips, or one-way insertion tabs on one piece of the housing 120 (either the top or the bottom) with one-way receiving slots on the other piece of the housing 120. If a one-way lock mechanism is used, then the device 100 may need to be broken and replaced in order to act as a control device for the same and/or other electronic entertainment systems. Various lock mechanisms are possible and are within the scope of this disclosure as long as the mechanism allows an operator (such as a parent or guardian or supervisor) to secure the top of the housing 120 to the bottom of the housing 120 (or alternatively one half or portion of the housing to the other half or portion of the housing) in a way that does not allow, or that at least does not easily allow, a child or other potential user of the video game console 110 to open and gain access into the locked housing 120. The lock mechanism should be able to be locked and unlocked repeatedly over time, to allow the device 100 to be used with different electronic entertainment systems over time.

The housing 120 of the device 100 can be two separate halves—a bottom and a top—as hereinbefore described, or the housing 120 can be a hinged clam-shell configuration where the top and bottom are hinged together along one side. If a hinged configuration, the housing 120 can be made of plastic by injection molding, and the hinge can be a so-called living hinge. Various other possibilities exist for configuring and forming the housing 120 of the device 100, as will be appreciated and understood by one of ordinary skill. For example, the housing 120 could be a rigid plastic or metal box with a separate or hinged (a living hinge or one or more mechanical hinges similar to hinges used on a wooden cabinet door) top or side or bottom. The active lock mechanism could be located on one part of the housing with the receiving or passive part of the lock mechanism located on the other part of the housing.

The device 100 also includes a device power cord 160 extending from and external to the housing 120 of the device 100. The device's power cord 160 terminates in a device power plug 170 for insertion into an electrical outlet such as a typical household electrical wall socket. The device 100 also can include one or more connectors accessible external to the housing 120 to allow a display 180 to be connected to the device 100. The display 180 can be a television or a video monitor. An alternative to having or using the connector(s) accessible external to the housing 120 to allow the display 180 to be connected to the device 100 is to have supplied with the device 100 a handheld input unit 210 that has one or more connectors 220 for coupling to the display 180 (FIG. 2). As another alternative, the device 100 can be supplied with such display connector(s) that extend directly from the housing 120 of the device 10, and thus the handheld input unit 210 would not need to have or use the connectors 220 that extend from the unit 210.

A logic and control system 190 of the device 100 is disposed within the housing 120, and it controls the power outlet 130. The logic and control system 190 also supplies images to be shown on the display 180 to a potential user of the video game console 110, and these images include educational content in the form of one or more questions in one or more educational subject matter areas. The logic and control system 190 also allows the potential user to provide responses to the one or more questions, and it controls the supply of power to the power outlet 130 based on the responses to those questions. The logic and control system 190 will not supply power to the power outlet 130 unless the responses to the one or more questions are acceptable.

The device also can have one or more other connectors accessible external to the housing 120 to allow a handheld controller unit 200 of the video game console 110 to be plugged in to the device 100 and then used by the potential user to provide his or her responses to the one or more questions posed by the device 100 and displayed on the display 180 connected to the device 100. Instead of or in addition to the device 100 having the one or more other connectors, the device 100 can have supplied with it the handheld input unit 210 (that can be hard-wired to the device 100, as shown in FIG. 2, or wirelessly connected to the device 100). The handheld input unit 210, whether wireless or hard-wired, is for use by the potential user to provide the responses to the one or more questions, and the unit 210 typically will have at least an up-down button and an enter button. As shown, the unit 210 has an up-down-left-right button on its top left surface and an enter button on its top right surface. The handheld input unit 210 can be configured to be the top of the housing 120 that gets locked onto the bottom of the housing 120, thereby eliminating the need for a separate top piece that gets locked onto the bottom piece of the housing 120. The device 100 also can include one or more additional power outlets disposed within the housing 120 for allowing the device 100 to control the use of more than one video game console 110.

The device 100 is shown (FIG. 1) with an internal power supply 230, but it is noted that the device 100 does not have to have the internal supply 230. The device 100 also has a switch or relay 240. The switch 240 is also referred to in the drawings as a solenoid.

The logic and control system 190 controls the switch 240 to either supply power to the outlet 130 or else prevent power from reaching the outlet 130. The logic and control system 190 is disposed within the housing 120, and it can be programmable. That is, the logic and control system can include computer code that is updateable. The code can be updated via an Internet connection to the device 100 or with a portable memory stick that plugs into the device 100 or otherwise. The updateability allows the questions and topics presented to users by the device 100 to be changed over time.

The logic and control system 190 of the device 100 can be configured to supply power to the power outlet 130 (by operating the switch 240) only if the responses include enough correct answers to the one or more questions, and that logic/control system 190 also can be configured to stop supplying power to the power outlet 130 after a predetermined amount of time from when the responses were deemed acceptable. Once the logic and control system 190 of the device 100 operates the switch 240 and allows power to be supplied to the outlet 130, the video game console 110 is energized and can then be used. The video game console 110 may have its own display screen, or it may be connected to the display 180 and use the display 180 as its display screen.

Figure 3:
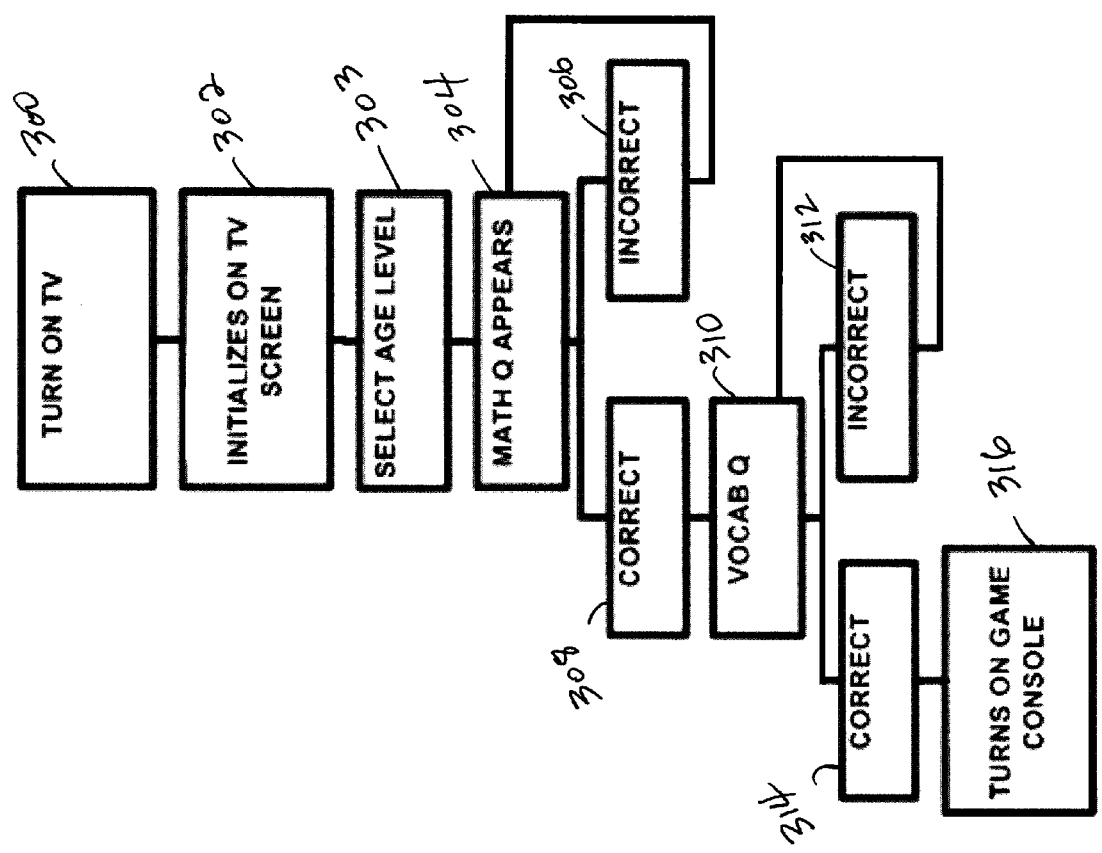
FIG. 3 is flow diagram showing how the lock-box device of the invention operates.

When one or more electronic entertainment systems are connected to the device 100, such as the video game console 110, and when the device 100 is connected to the display 180, and when the device 100 is powered on, the device 100 will operate as indicated in FIG. 3 after the display 180 also is powered on (Step 300). The device 100 first will perform an initialization process (step 302) and will show on the display 180 an initial image such as a branded logo and/or other initial information. After initialization, the device 100 will need to be set up if it has not yet been previously set up. The set-up for the device 100 is something that will have to be done initially at least to set the age (or age range) and/or school grade (or grade range) of the expected user (step 303), and this is typically done by the expected user's parent, guardian, or supervisor by that adult following some basic set-up prompts provided on the display 180 by the device 100. The set-up mode can be entered again after the initial set-up, and entry into the set-up mode of the device 100 can be password or PIN protected in order to prevent the child from tampering with the difficulty level set by the child's parent, guardian, or supervisor.

If set-up has already been done previously and it does not need to be adjusted, the normal operation of the device 100 will involve step 303 being an educational topic selection step. The educational topic of interest can be selected from a screen shown on the display 180 such as the simplified sample screen shot 400 shown in FIG. 4. If the child selects math as the topic (using the controller 200 or the unit 210) from screen 400, the device 100 could next ask the child user select a subtopic under the math heading such as algebra, geometry, or arithmetic, as shown by simplified sample screen shot 402. And, if algebra is selected by the child (again, using the controller 200 or the unit 210) from screen 402, the device 100 could then cause an algebra question to appear on the display 180 such as the one shown in the simplified sample screen shot 404. This algebra question appearing on the display 180 also is identified as step 304 in FIG. 3. If the child does not select the correct answer from screen 404, the program flow of the device 100 continues to the "incorrect" box 306 which will result in the device 100 causing the display 180 to show a screen that indicates to the child user that the selected answer is wrong. The device 100 then will cause the display 180 to show another (different) algebra question, or it could show the same question to give the child user another chance. It could show the same question with a hint to help the child user select the correct answer. The same question could be shown two or more times until the child user selects the correct answer. The same question could be shown no more than two or three or some other number of times before the device 100 causes the display 180 to show a different algebra question. Various question presentation arrangements are possible and within the scope of this disclosure. If the child selects the correct answer, whether it is on the first or a subsequent try, the device 100 will cause the display 180 to show an indication that the correct answer was selected such as the simplified sample screen shot 406 of FIG. 4. While screen 406 indicates that the selection of the correct answer will result in the video game console 110 being energized and thus available for use by the child, it most typically will be the case that the device 100 will require more than just a correct answer to a single question before it energizes the video game console 110.

The device 100 typically will present a certain number of questions in each of two or more educational subject matter areas and require a certain number of correct answers in each of the areas, such as, for example, ten correct answers in math and ten correct answers in English. As shown in FIG. 3, at least one correct answer in math is required and also required is at least one correct answer in vocabulary. The topics and subtopics within any given topic can be varied by the device 100 and/or can be determined by the device 100 as opposed to allowing the child user to select the topic and subtopic as is indicated in FIG. 4. FIGS. 3 and 4 show particular illustrative embodiments of the operation of the device 100, but the embodiments depicted in FIGS. 3 and 4 are not the only embodiments possible with the operation of the device 100. The educational topics presented can be different than shown in screen 400, and again the device 100 can decide the topic(s) and/or subtopic(s) automatically instead of allowing the user to select the desired topic(s) and/or subtopic(s). And similarly the educational subtopics can be different than shown in screen 402. The device 100 can cause the display 180 to show a variety of types of questions other than the four-option type of question shown in screen 404, and the device 100 also can cause the display 180 to show a variety of types of responses if the user's selected answer is correct or incorrect other than the particular response shown in screen 406.

Certain embodiments according to the invention have been disclosed. These embodiments are illustrative of, and not limiting on, the invention. Other embodiments, as well as various modifications and combinations of the disclosed embodiments, are possible and within the scope of this disclosure.

What is claimed is:

1. A device for controlling access to and use of a video game console, comprising:
    a tamper-resistant housing including a lock mechanism;
    a power outlet disposed within the housing and for receiving and electrically connecting to a power plug at the end of a power cord of the video game console, the lock mechanism operable to lock the power plug within the housing after the power plug is inserted into the power outlet;
    a device power cord extending from and external to the housing and terminating in a device power plug for insertion into an electrical outlet;
    one or more connectors accessible external to the housing to allow a display to be connected to the device;
    one or more other connectors accessible external to the housing to allow at least one handheld controller unit of the video game console to be connected to the device; and
    a logic and control system disposed within the housing and for supplying images to be shown on the display to a potential user of the video game console, the images including educational content in the form of one or more questions in one or more educational subject matter areas, the logic and control system also for allowing responses to the one or more questions by the potential user, the at least one handheld controller unit of the video game console for use by the potential user to provide the responses to the one or more questions, the logic and control system also for controlling the supply of power to the power outlet based on the responses to the one or more questions, the logic and control system configured to not supply power to the power outlet unless the responses to the one or more questions are acceptable.

2. The device of claim 1 further comprising one or more additional power outlets disposed within the housing for allowing the device to control the use of more than one video game console.

3. The device of claim 1 wherein the logic and control system supplies power to the power outlet only if the responses include enough correct answers to the one or more questions.

4. The device of claim 1 wherein the logic and control system stops supplying power to the power outlet after a predetermined amount of time from when the responses were deemed acceptable.

* * * * *